United States Patent
Beirakh et al.

(12)

(10) Patent No.: US 6,831,109 B1
(45) Date of Patent: Dec. 14, 2004

(54) MODIFIER FOR DEVULCANIZATION OF CURED ELASTOMERS, MAINLY VULCANIZED RUBBER AND METHOD FOR DEVULCANIZATION BY MEANS OF THIS MODIFIER

(75) Inventors: Lev Beirakh, Jerusalem (IL); Michael Kopylov, Beer Sheva (IL); Vadim Goldstein, Har Hebron (IL)

(73) Assignee: Lev-Gum LTD, Kiryat Arba (IL)

( * ) Notice: Subject to any disclaimer, the term of this patent is extended or adjusted under 35 U.S.C. 154(b) by 168 days.

(21) Appl. No.: 10/110,855

(22) PCT Filed: Oct. 12, 2000

(86) PCT No.: PCT/IL00/00643

§ 371 (c)(1),
(2), (4) Date: Aug. 30, 2002

(87) PCT Pub. No.: WO01/29122

PCT Pub. Date: Apr. 26, 2001

(30) Foreign Application Priority Data

Oct. 17, 1999 (IL) .................................................. 132422

(51) Int. Cl.$^7$ ............................................... C08J 11/04
(52) U.S. Cl. ........................... 521/41; 521/42; 521/42.5
(58) Field of Search ........................... 521/40, 40.5, 41, 521/42.5, 43.5

(56) References Cited

U.S. PATENT DOCUMENTS

| 3,933,756 | A | * | 1/1976 | Wagner ...................... 525/440 |
| 4,104,205 | A | | 8/1978 | Novotny et al. |
| 5,258,413 | A | | 11/1993 | Isayev |
| 5,677,354 | A | | 10/1997 | Oliveira Da Cunha Lima |
| 5,731,358 | A | | 3/1998 | Pillai |
| 5,798,394 | A | | 8/1998 | Myers et al. |
| 5,883,140 | A | | 3/1999 | Fisher et al. |
| 5,891,926 | A | | 4/1999 | Hunt et al. |

FOREIGN PATENT DOCUMENTS

EP 0 690 091 A1 1/1996

* cited by examiner

*Primary Examiner*—Katarzyna Wyrozebski
(74) *Attorney, Agent, or Firm*—Richard C. Peet; Foley & Lardner LLP

(57) ABSTRACT

The invention provides a modifier for devulcanization of cured elastomers, and especially vulcanized rubber, said modifier containing a first chemical substance, which is disposed towards on and the formation of an organic cation and amine, and further containing a second chemical substance as promotor of dissociation of the first chemical substance, said promotor containing a functional group constituting an acceptor of said amine.

9 Claims, No Drawings

MODIFIER FOR DEVULCANIZATION OF CURED ELASTOMERS, MAINLY VULCANIZED RUBBER AND METHOD FOR DEVULCANIZATION BY MEANS OF THIS MODIFIER

The present invention relates to a modifier for devulcanization of cured elastomers and to a method for devulcanization of cured elastomers utilizing the same.

It is known that a spatial network of sulfur-cured elastomers has three types of chemical bonds:
C—C, S—C, S—S, i.e. carbon-carbon bonds, sulfur-carbon bonds and sulfur-sulfur bonds.

The devulcanization is conducted by means of destruction of the inter-chain cross bonds S—C and S—S in the elastomer, which bonds are weaker than main-chain C—C bonds.

Several methods for devulcanization of cured elastomers, mainly of rubber, are known at present.

In some of these methods, stressed cured rubber is treated by high temperature (U.S. Pat. Nos. 5,883,140, 5,731,358) or by microwave action, accompanied by heating the material (U.S. Pat. No. 4,104,205).

Deep destruction of the main chains accompanies all the high-temperature methods and thus leads to the partial loss of physical and mechanical properties of secondary vulcanizates.

Other methods (U.S. Pat. No. 5,258,413) involve ultrasonic treatment of rubber through a liquid medium.

This method requires further separation of finished material from liquid and for this reason is too complicated.

Devulcanization by means of biotechnological reactions is described in several patents (U.S. Pat. Nos. 5,677,354, 5,798,394, 5,891,926).

This method require complicated equipment, large floor-space and excessive operating time.

All the above-mentioned methods, do not use ambient solid-phase modifiers. Modifiers are solid substances, generating a specific agent, which initiates destruction of inter chain cross bonds C—S and S—S bonds and thus brings about the devulcanization of cured elastomers.

It is well known that the devulcanization process is aimed at obtaining secondary vulcanizates with a minimal loss of main physical and mechanical parameters (tensile strength, elasticity, elongation etc.). One of the main factors, which are negatively influent at these parameters, is a destruction of main-chain bonds.

An ambient solid-phase modifier for devulcanization is known (see, e.g., EP 0 690 091 A1). This modifier includes two substances, which generate protons during reaction and initiate a proton exchange with the polymer structure of a pre-stressed cured elastomer. In response to this interaction the elastomer is devulcanized. The process is conducted at smooth 2-roll mill under conditions of stressing the devulcanized material.

There are however disadvantages inherent in this method. Having a short term of active life, the proton penetrates into the material only to a small depth. This results in a need for fine grinding of the cured rubber (up to 0.4 mm and less) and correspondingly reduces cost-efficiency of this method.

Furthermore, the proton does not display good selective action to different bonds and along with the attack of C—C and S—S cross bonds, it attacks also C—C bonds and initiates their partial destruction. This brings about reduction of the physical and mechanical properties of secondary vulcanizate. According to the data of said patent, secondary devulcanizate from tire scraps show tensile strength at a level 11–13 MPa and elongation at break at a level 300–350%, which means retention of only 62–70% of its values as compared with primary (fresh rubber) vulcanizate.

An object of the present invention is to create an ambient solid-phase modifier and to develop conditions for its use, so that in the course of devulcanization components of the modifier will generate a specific agent, which selectively destroys inter-chain cross bonds and maximizes the retention of main-chain bonds while exhibiting a maximum term of active life. This modifier and mode of its use are to provide best permissible physical and mechanical properties of secondary vulcanizate and to obviate the need of fine grinding a vulcanized rubber before its devulcanization.

According to the present invention there is now provided a modifier for devulcanization of cured elastomers, and especially vulcanized rubber, said modifier containing a first chemical substance, which is disposed towards dissociation and the formation of an organic cation and amine, and further containing a second chemical substance as promotor of dissociation of the first chemical substance, said promotor containing a functional group constituting an acceptor of said amine.

Preferably said cured elastomers are carried to a state of stressed polymer structure and in this state they are treated by organic cations, which are generated by the modifier.

An interaction scheme of the modifier's components may be shown as follows:

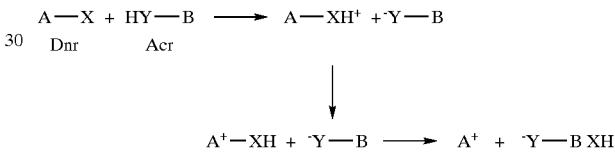

From this scheme follows that "Acr" is the acceptor of amine (□), whereas reagent "Dnr" is the donor of proton ( ). A—X represents a class of chemical compounds, which are disposed towards the formation of an organic cation and amine. HY—B represents a class of chemical compounds, which is promotor of dissociation for compounds from the class A—X and at the same time it is the acceptor of an amine.

Ionic compound $A^+ + {}^-Y$—B XH attacks chemical bonds of the polymer network. Cation $A^+$ appears in the main attacking agent, however it is not inconceivable that anion ${}^-Y$—B XH can also break down the bonds C—S and S—S.

An energetical level of cation ($A^+$) is lower than energetical level of proton, and owing to this fact the present modifier selectively breaks down the bonds C—S and S—S with much less effect on the C—C bonds.

In prefered embodients of the present invention said modifier contains urea or a mono- di- or tri-substituted derivative thereof as said first chemical substance and a dicarboxlic acid with 2–4 carbon atoms in the main chain as said second chemical substance, wherein the molar ratio of the first chemical substance to the second chemical substance ranges from about 0.5:1 to about 2.5:1.

In further prefered embodients of the present invention devulcanization is carried out in the present of said modifier ranging from about 0.25 to about 4.0% of the quantity of cured elastomers.

Preferably said modifier comprises urea derivatives containing nucleofilic substituents, because their use allows enlarging a term of active life of the cation due to distribution its positive charge.

The class of chemical compounds, to which relates A—X, has a structure as follows:

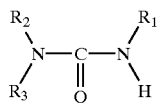

where in $R_1$, $R_2$, $R_3$—are organic radicals.ganic radicals.

This class of chemical compounds represents urea or its mono- di- or tri-substituted derivatives.

The class of chemical compounds, to which HY—B relates, has a structure as follows:

HOOC—R—COOH

This class of chemical compounds represents dicarboxylic acid with 0 . . . 8 carbon atoms in the main chain.

In this case a scheme of interaction between urea or its derivatives with dicarboxylic acid is formed the ionic compound:

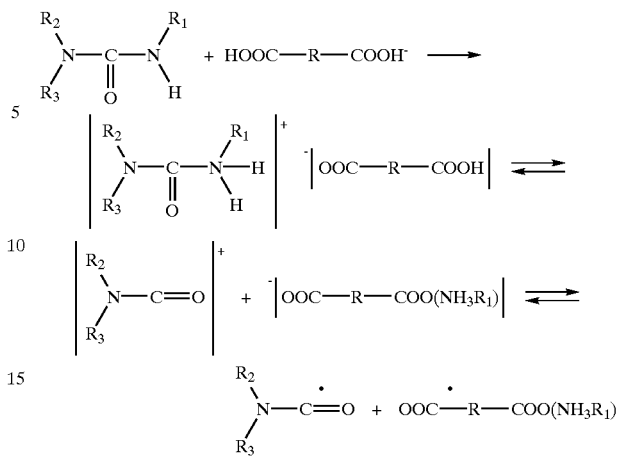

Destruction of the polymer network along the interchain bonds is assumed to occur as follows:

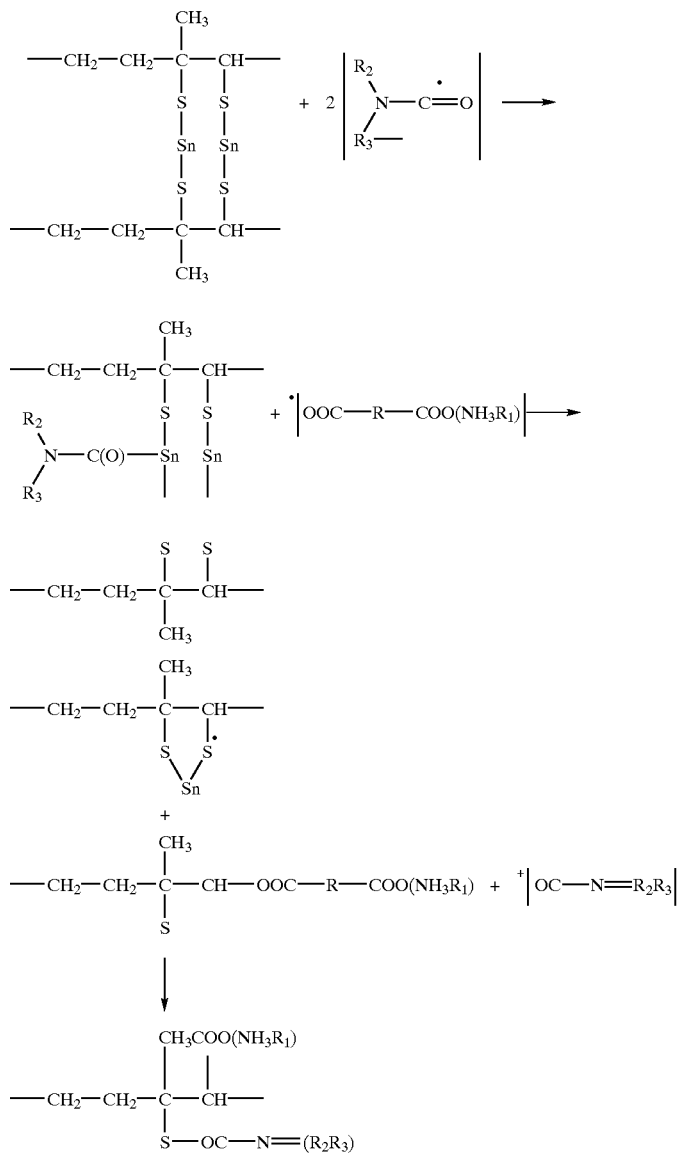

It is to be noted that all the schemes of reactions, structure of intermediates and finished compounds are hypothetical and are intended to serve to explain the effect of the modifier and method of the present invention.

In another aspect of the present invention there is provided a method for devulcanization of cured elastomers, an especially vulcanized rubber, wherein cured elastomers are carried to a state of stressed polymer structure and in this state they are treated by organic cations, which are generated by the modifier as claimed in claim 1.

In preferred methods of carrying out the ambient solid-phase devulcanization according to the present invention, the treated material is brought into the high stressed condition by means of transmission of the rubber mixed with modifier through a narrow nip between smooth rolls of a 2-roll mill. Preferably said nip is not more than 0.1 mm.

Preferably devulcanization is carried out in the presence of modifier ranging from about 0.25–4.0% of the quantity of cured elastomers. This range allows obtaining easy-processible devulcanizate with sufficient characteristics. The optimal tensile strength and elongation are reached within more narrow range—1.0–2.8%. As experiments have shown, within this range the retention of physical and mechanical characteristics of secondary vulcanizate in comparison with the primary one is the most.

In the case of preparation of devulcanizate, which would be well soluble in organic solvents and would yield pigments for paint and ink with enhanced adhesion characteristics, it is preferred that a weight devulcanization be carried out in the presence of modifier ranging from about 4.0 to about 10.0% of the cured elastomers.

In some cases it is preferred that devulcanization be conducted using further components in addition to the rubber mixture (rubber crumb, modifier and additives) including salts of aliphatic acids having a main chain length of at least 10 carbon atoms.

This makes it possible to obtain a finished material in the loose (powder-like) state. Loose material is preferable in many technological processes.

In addition it has now been shown by experiments that if the initial rubber mixture lacks of natural or synthetic rubber and curing group, it may be obtained in the loose form by alternative method: After finishing of the formation the material, a process continues at gradually increasing nip to the point of reaching the loose state.

The proposed modifier is prepared by simple dry mixing of at least two components. The first component is preferably urea or its mono-, di- or tri-substituted derivative, which is disposed towards dissociation and creation an organic cation and amine. The second component is preferably a dibasic carboxylic acid as promotor of dissociation of first component, in so doing this promotor contains a functional group constituting the acceptor of this amine.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

In accordance with present invention devulcanization of vulcanized rubber in the form of crumb (size 0.5–5.0 mm) or pieces (thickness—up to 15 mm) was carried out. Pieces or crumb were mixed previously with the modifier in the dry state and charged into the 2-roll mill with smoothed rolls.

The process was conducted under the following conditions,

Temperature—not exceeding 40° C. (at perpetually cooled rolls);

Nip—minimally permissible (0,. mm);

Friction—1.1–1.8;

Reentry of material to rolls—manual;

Duration of processing—7–12 min.

When natural or synthetic rubber and curing group were included into the formulation, they were added either together with modifier or just prior to use (pressing, extruding etc.).

So as to obtain finished material in the loose (powder-like) state two alternative methods were used:

a) In the case in which natural or synthetic rubber and curing group and other additives are added prior to processing, 0.5–1.0% of salts of aliphatic acids with length of the main chain of at least 10 carbon atoms (soaps) were added into the initial mixture.

b) After finishing of the formation the material, lacking of natural or synthetic rubber and curing group, a process continues at gradually increasing nip to the point of reaching the loose state.

2 mm plates of secondary vulcanizate were pressed from the devulcanizate by temperature 145–155° C. during 10–12 min.

Standard samples were cut from these plates. Physical and mechanical parameters of the samples were tested by universal Lloyd tensometer Module 100% (Mod100, tension at 100% elongation)—MPa;

Module 200% (Mod200, tension at 200% elongation)—Mpa;

Module 300% (Mod300, tension at 300% elongation)—Mpa;

Tensile strength at break (TS)—MPa;

Elongation at break (EB)—%

Tests results for different formulations of modifiers and for different conditions of embodiment of the described method are given in table 1.

TABLE 1

Test results of devulcanizates for secondary vulcanization

| NN | Vulcanized rubber Source | Size of pieces of particles | Modifier 1 component | Modifier 2 component (number of C-atoms in main chain) | Ratio of first component to second | Contents of modifier per 100 gr of vulcanizate | Additives | Mod 100 MPa | Mod 200 MPa | Mod 300 MPa | TS, MPa | ER, % | Form of finished product, notes |
|---|---|---|---|---|---|---|---|---|---|---|---|---|---|
| 1 | Car tires buffings | 0.5–5 mm | Urea | Adipic acid (4) | 2.0:1.0 | 2.0 | NR-23%; Sulfur-0.9% ZnO-1.0%; Stearic acid-0.5%; CBS-0.2% | 2.5 | 6.4 | 13.8 | 18.5 | 350 | Material in soft, doughy form |
| 2 | Car tires buffings | 0.5–5 mm | Urea | Oxalic acid (0) | 2.0:1.0 | 1.9 | SBR-23%; Sulphur-0.9% ZnO-1.0%; Stearic acid-0.5%; Altax-0.2% | 2.1 | 5.9 | 11.7 | 15.5 | 350 | Material in soft, doughy form |
| 3 | Production wastes | 10–15 mm | Urea | Adipic acid (4) | 1.4:1.0 | 1.0 | NR-23%; Sulphur-0.4%; ZnO-1.0%; Stearic acid-1.5%; CBS-0.1% | 1.6 | 2.5 | 4.0 | 11.0 | 750 | Material in soft, doughy form |
| 4 | Production wastes | 10–15 mm | Urea | Adipic acid (4) | 2.0:1.0 | 2.6 | SBR-23%; Sulphur-0.9%; ZnO-1.0%; Stearic acid-0.5%; CBS-0.2% | 5.6 | 8.4 | 13.5 | 18.8 | 370 | Material in soft, doughy state |
| 5 | Truck tires buffings | 0.5–5 mm | Urea | Adipic acid (4) | 1.0:2.0 | 2.0 |  | 1.4 | 2.4 | 4.1 | 10.8 | 590 | Material in loose, granulated form |
| 6 | Production wastes | 10–15 min | Urea | Adipic acid (4) | 1.7:1.0 | 2.0 | Sulphur-0.9%; ZnO-1.0%; Stearic acid-0.5%; | 1.8 | 3.0 | 5.5 | 10.5 | 550 | Loose, additives inserted after de-vulcanization |
| 7 | Truck tires buffings | 0.5–5 mm | Urea | Sebacic acid (8) | 1.0:1.0 | 1.0 | NR-23%; Sulphur-0.9%; ZnO-1.0%; Stearic acid-0.5%; CBS-0.2% | 2.2 | 4.8 | 6.2 | 8.2 | 570 | Material in soft, doughy state |
| 8 | Car tires buffings | 0.5–5 mm | Urea | Adipic acid (4) | 2.0:1.0 | 0.35 | SBR-23%; Sulphur-0.9%; ZnO-1.0%; Stearic acid-0.5%; Altax-0.2% | 1.0 | 2.0 | 2.4 | 5.8 | 350 | Material in soft, doughy form |
| 9 | Truck tires buffings | 0.5–5 mm | Urea | Oxalic acid (0) | 1.0:1.0 | 7.0 | NR-10%; Sulphur-2.5%; ZnO-2.0%; Stearic acid-1.5%; | — | — | — | 2.7 | 20 | Material in porous, rigid form |

From this table it will be obvious that use of the method of the present invention (examples 1–8) provides secondary rubber volcanizates with physical and mechanical characteristics which are sufficient for most applications. The samples tested overcome considerably corresponding values for modifier according to patent EP 0 690 091 A1 (cited above) by tensile strength and modules (examples 1,2 and 4) or by elongation (examples 3,5,6 and 7). These values were reached both for ground crumb (examples 1,2,5,7 and 8) and for large pieces (examples 3,4 and 6).

One can see from the table 1 that when the share of the modifier is taken within the range 1.0–2.8% from a quantity of cured elastomers (examples 1–7), the set of parameters is considerably better than that when share of the modifier is outside of this range (examples 8 and 9).

Table 1 also shows that the use of the present methods allows to yield finished materials in the loose form (examples 5 and 6).

In the case of use other modes of devulcanization (not included in the given table) physical and mechanical characteristics of secondary rubber vulcanizates change, however their level would exceed the characteristics of analogous products, obtained by the above-mentioned method.

Samples of devulcanizates, which were obtained by means of devulcanization at the ratio of modifier to vulcanized rubber being within the range 4.0–10.0%, were treated with toluene or with xylene so as to obtain a stable suspension. Such a suspension may be used for preparing paints, inks and other similar applications.

The obtained samples were tested for:
Solubility of polymer component in above-mentioned solvents.
Rate of dissolving in the preparation of 10% solution.
Granulometric distribution of rubber particles in suspension. Two examples of embodiments of the present method are given in table 2.

TABLE 2

Test results of soluble devulcanizates

| | Vulcanized rubber | | Modifier | | | Contents of | | Test results | | | |
|---|---|---|---|---|---|---|---|---|---|---|---|
| NN | Source | Size of pieces or particles | 1 component | 2 component | Ratio of first component to second | modifier per 100 gr of vulcanized rubber | Additives | Solubility of polymer fraction | Solution rate for preparation 10% solution | Size of particles | Form of finished product |
| 1 | Truck tires buffings | 0.5–5 mm | Urea | Adipic acid | 1.2:1.0 | 8.0 | Toluene-300% | 100% | 10–15 min | 90% < 60 mcm | Finely ground suspension |
| 2 | Production wastes | 0.5–5 mm | Urea | Adipic acid | 0.5:1.0 | 5.0 | Xylene-250% | 100% | 20–25 min | 75% < 60 mcm | Finely ground suspension |

As seen from table 2 when a share of modifier lies within the range of 4.0–10.0%, the finished product is appropriate for use as a pigment for preparation of paints, inks and other applications, because its properties fit commonly accepted requirements for these materials.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A modifier for devulcanization of sulfur cured elastomers, said modifier containing a first chemical substance, which is disposed towards dissociation and the formation of an organic cation and amine, and further containing a second chemical substance as a promoter of dissociation of the first chemical substance, said promoter containing a functional group constituting an acceptor of said amine, and wherein said modifier selectively initiates destruction of inter-chain C—S and S—S cross bonds.

2. A modifier according to claim 1, wherein said first chemical substance is urea or a urea derivative of the following formula:

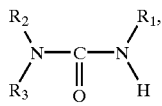

where $R_1$, $R_2$ and $R_3$ are each independently hydrogen or an organic radical; wherein said second chemical substance is a dicarboxylic acid with 2–8 carbon atoms in the main chain; and wherein the molar ratio of the first chemical substance to the second chemical substance ranges from about 0.5:1 to about 2.5:1.

3. A modifier according to claim 2, wherein said organic radicals are nucleophilic.

4. A method for devulcanization of sulfur cured elastomers, wherein cured elastomers are carried to a state of stressed polymer structure and in this state they are treated by organic cations, which are generated by the modifier as claimed in claim 1, and wherein said modifier selectively initiates destruction of inter-chain C—S and S—S cross bonds.

5. A method according to claim 4, wherein devulcanization is carried out in the presence of said modifier ranging from about 0.25 to about 4.0% of the quantity of cured elastomers.

6. A method according to claim 4, wherein devulcanization is carried out in the presence of said modifier ranging from about 4.0 to about 10.0% of the quantity of cured elastomers.

7. A method according to claim 5 wherein devulcanization is carried out using salts of aliphatic acids having a main chain length of at least 10 carbon atoms.

8. A modifier according to claim 1, wherein said sulfur cured elastomers are vulcanized rubber.

9. A method according to claim 4, wherein said sulfur cured elastomers are vulcanized rubber.

* * * * *